C. H. LIGHT.
HOSE COUPLING.
APPLICATION FILED MAR. 17, 1913.
1,154,259.
Patented Sept. 21, 1915.
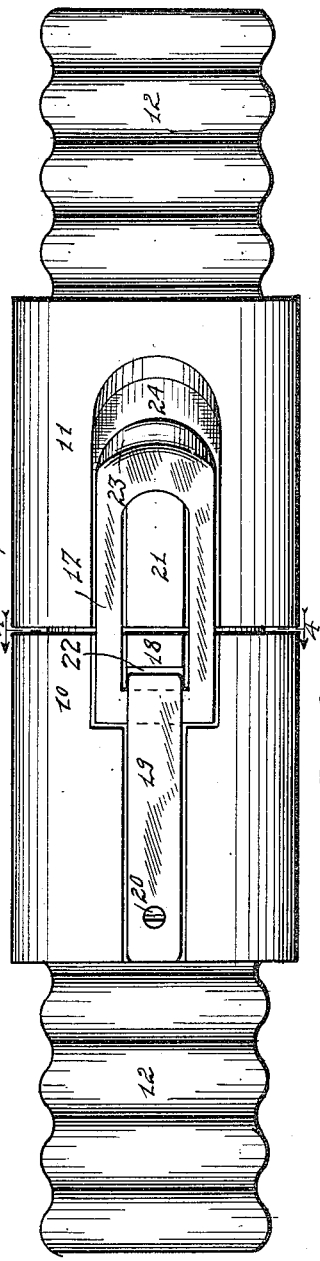
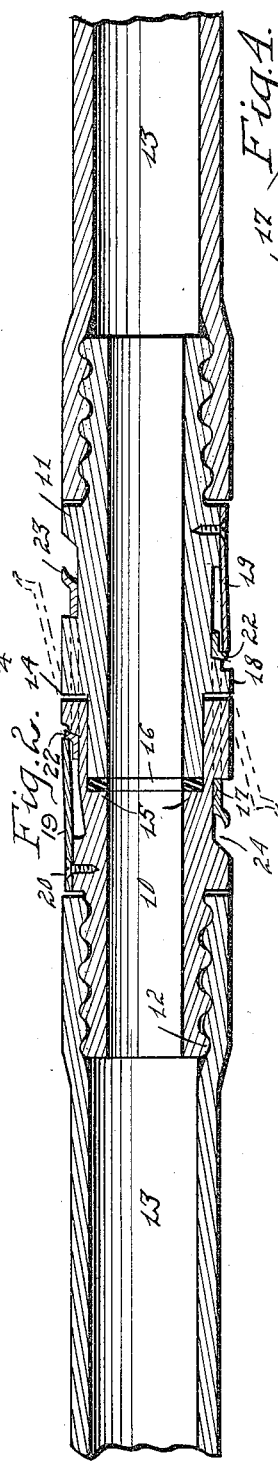
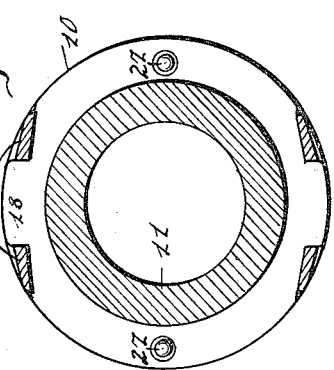
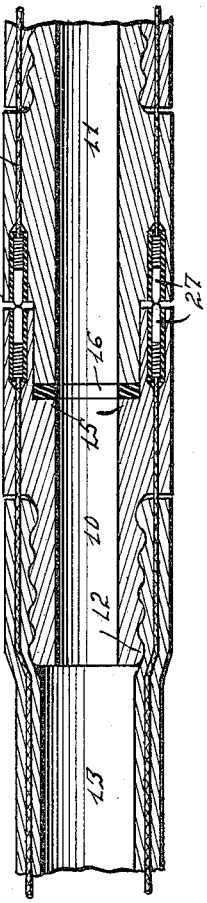
WITNESSES:
INVENTOR.
Claus H. Light
BY
ATTORNEYS

UNITED STATES PATENT OFFICE.

CLAUS H. LIGHT, OF DES MOINES, IOWA.

HOSE-COUPLING.

1,154,259.  Specification of Letters Patent.  Patented Sept. 21, 1915.

Application filed March 17, 1913. Serial No. 755,026.

*To all whom it may concern:*

Be it known that I, CLAUS H. LIGHT, a citizen of the United States, residing at Des Moines, in the county of Polk and State of Iowa, have invented a certain new and useful Hose-Coupler, of which the following is a specification.

The object of my invention is to provide a hose coupler simple and inexpensive in construction, designed for use especially with fire hose and arranged so that the sections comprising the coupler are connected together by means of spring actuated loops, thus eliminating the screw threaded connection commonly used for this purpose to thereby render it possible to effect a coupling of the hose sections in a minimum of time.

My invention consists in certain details, in the construction, arrangement and combination of the various parts of the device, whereby the objects contemplated are attained, as hereinafter more fully set forth, pointed out in my claim, and illustrated in the accompanying drawings, in which:

Figure 1 shows a plan of my improved coupler. Fig. 2 shows a central, longitudinal, sectional view of same. Fig. 3 shows a view similar to that of Fig. 2 but taken at right angles thereto, and Fig. 4 shows a sectional view taken on the line 4—4 of Fig. 1.

My device comprises two cylindrical body portions 10 and 11, each provided at one end with corrugations 12 to receive sections of hose 13. The parts 10 and 11 are designed to telescopically connect, and for this purpose the connecting ends are provided, one with an external shoulder 14 and the other with an internal shoulder 15, and interposed between the internal shoulder 15 and the abutting end of the adjacent body portion is a packing ring 16 for the purpose of forming a water tight connection. Grooves 24 are formed in the opposite sides of each body portion. A loop 17 is pivoted to each of said body portions near its connecting end in one of said grooves, said loop being in position thereon in engagement with the side of a portion 18 of the body portion which is located between the free end of the body portion and the parts of the groove 24. The grooves 24 are extended longitudinally of the body portions beyond the loops 17. The loop 17 on each body portion overlaps the other body portion, as shown, and in its lowered position rests in the grooves 24 of both body members. Each of the loops 17 is held in place by means of a flat metal spring 19 secured to the body portion by means of a pin or a screw 20. In line with each of the loops and on the adjacent body portion is a lug 21 to receive the forward end of said loop to thereby hold the portions 10 and 11 securely together.

The pivoted end of each of the loops 17 is preferably provided with an upturned rim 22 at its internal edge and when the loop is moved to a substantially horizontal position the spring 19 engages the upturned edge 22 and securely holds said loop in position. The forward end of each of the loops is upwardly curved at 23 and the groove 24 is of proper size to afford space for gripping the ends of the loops when it is desired to disconnect the sections of the coupler.

The clamping devices just described are arranged at opposite points on the periphery of the coupler and the springs and loops are preferably countersunk in the body portion of the coupler, and thus the assembled device presents a smooth circumferential surface, as shown in Fig. 4.

Obviously when the parts are in locked position the connecting sections will at all times occupy the same positions relatively, and because of this, I am enabled, with the use of this coupler, to provide, in connection with the fire hose, wires 25 to carry electric currents for ringing a bell or flashing a signal light at some point on the hose say, for instance, on the nozzle. Each hose section will therefore be provided with wires connected to contact points 27 projecting from the external shoulders of the sections of the coupler, and with the use of my clamping devices an engagement of the adjacent contact points is always assured.

The signal device just mentioned is embodied in a separate application filed by me and bearing an even date and the purpose for mentioning it herein is to show one of the important advantages of my coupler in addition to the rapidity and use with which the connecting sections may be coupled.

In the operation of my improved coupler, the two sections comprising the device are fitted together telescopically in the manner shown and the loops 17 are then moved inwardly to engagement with the lugs 21.

When it is desired to disconnect the coupler, the springs are depressed until their free ends clear the shoulders 22 and the loops 17 are moved outwardly to the positions shown by dotted lines in Fig. 2.

It is obvious that by reason of the simplicity of the operation of my device a connection can be effected with much more rapidity than is possible with the use of the ordinary forms of couplers.

Owing to the manner in which the springs 19 engage the loops 17 it is obvious that the said loops when in their closed positions, will be held secure against outward movement by the engagement of the said springs with the upturned edges 22 of the loops.

I claim as my invention:

A hose coupler, comprising two cylindrical body portions designed to be locked in alinement with each other, and having coacting shoulders on their adjacent ends for forming a telescopic connection, said bodies each being provided with notches in opposite sides of its outer surface, flat loops, arranged to rest in notches in both body portions, said notches being extended longitudinally beyond the ends of the loops received therein, a shoulder on one end of each loop, a spring secured to each body portion and extending across a portion of the notch and across a part of the end of the spring, and adapted to engage the shoulder on said end when the spring is in its position received in the notches, for holding the spring against being tilted upwardly in any way, and adapted to be released from engagement with said shoulder by being pressed downwardly into the space in the notch between the spring and the wall of the notch farthest from the abutting ends of the body portions.

Des Moines, Iowa, March 10, 1913.

CLAUS H. LIGHT.

Witnesses:
 MARY WALLACE,
 SARA ROBINSON.

Copies of this patent may be obtained for five cents each, by addressing the "Commissioner of Patents, Washington, D. C."